United States Patent
Fried et al.

(10) Patent No.: US 9,177,296 B2
(45) Date of Patent: Nov. 3, 2015

(54) COMPOSING, FORWARDING, AND RENDERING EMAIL SYSTEM

(75) Inventors: Eric Philip Fried, Austin, TX (US); Vijayasekhar Mekala, Andhra Pradesh (IN); Rajeev Mishra, Karnataka (IN); Suresh Sabarathinam, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1897 days.

(21) Appl. No.: 12/059,299

(22) Filed: Mar. 31, 2008

(65) Prior Publication Data

US 2009/0248812 A1 Oct. 1, 2009

(51) Int. Cl.
*G06Q 10/10* (2012.01)

(52) U.S. Cl.
CPC .................. *G06Q 10/107* (2013.01)

(58) Field of Classification Search
USPC .................................. 709/204–207
See application file for complete search history.

(56) References Cited

U.S. PATENT DOCUMENTS

| | | | |
|---|---|---|---|
| 6,631,398 B1 | 10/2003 | Klein | |
| 7,143,356 B1 | 11/2006 | Shafrir et al. | |
| 7,243,125 B2 | 7/2007 | Newman et al. | |
| 7,275,215 B2 | 9/2007 | Werndorfer et al. | |
| 7,305,069 B1 | 12/2007 | Day | |
| 2004/0186996 A1* | 9/2004 | Gibbs et al. | 713/168 |
| 2005/0015457 A1* | 1/2005 | Warasawa | 709/207 |
| 2005/0021642 A1* | 1/2005 | Nonaka | 709/206 |

OTHER PUBLICATIONS

J.Galvin, S. Murphy, S. Crocker, N. Freed; RFC 1847—Security Multiparts for MIME: Multipart/Signed and Multipart/Encrypted; Oct. 1995; Internet Engineering Task Force; US.

* cited by examiner

*Primary Examiner* — Jackie Zuniga Abad
(74) *Attorney, Agent, or Firm* — Damion Josephs; Robert C. Rolnik

(57) ABSTRACT

The present invention provides a computer implemented method for communicating a signature in a received email. Initially, a server receives a source email from a source client, the source email comprising a signature index entry, and a body. The server determines for a first recipient that a first associated destination client is capable of rendering a signature of the signature index entry in response to a selection of an indexed signature. The server, responsive to a determination that the destination client is capable of rendering the signature index entry, forwards the source email to the first recipient as a delivered email using the body of the source email such that an indexed signature is present in the body of the delivered email. In addition, a method for generating a signature header is shown that provides a many to one correspondence between indexed signatures and a signature index entry.

17 Claims, 7 Drawing Sheets

FIG. 3A
- 301
  - Date: Wed, 06 DEC 2000 18:34:03 -0600
  - From: John X Doe <jdoe@example.com>
  - X-Mailer: Mozilla 4.61 [en] (Win95; I)
  - X-Accept-Language: en
  - X-signature: jdoe@example.com :: BEGIN:VCARD
        VERSION:2.1
        N:Doe; John         339
        FN:John Doe
        ORG: Example Amalgamated                     } 305
        REV:20080201T210646Z
        END:VCARD
  - MIME-Version: 1.0
  - To: Jane Doe <janedoe@example.com>
  - Subject: Hi there!
  - References: <5.0.0.25.2.20001128152553.00f90cd0@example.com>
  - Content-Type: text/plain; charset=us-ASCII
  - Content-Transfer-Encoding: 7bit
- 302
- 303
  - How is the weather in Sunny Dallas? It is mighty cold here in Chicago.
  - sig://jdoe@example.com  ~333

300

400

| 401 | 403 |
|---|---|
| johndoe@example.com | BEGIN:VCARD\n\rVERSION:2.1\n\rN:Doe;John\n\rFN:John Doe\n\rORG:Example Amalgamated\n\rREV:20080201T210646Z\n\rEND:VCARD\n\r |
| ⋮ | ⋮ |

FIG. 4

```
Subject: Hi there!
Date: Fri, 1 Feb 2008 09:21:54 -0600
MIME-Version: 1.0
Content-Type: multipart/mixed;
        boundary="----=_NextPart_000_0009_01C864B3.E29C0B20"
X-Priority: 3

This is a multi-part message in MIME format.

------=_NextPart_000_0009_01C864B3.E29C0B20
Content-Type: text/plain;
        format=flowed;
        charset="iso-8859-1";
        reply-type=original
Content-Transfer-Encoding: 7bit How is the weather in sunny Dallas?  It is mighty cold here in Chicago.

sig://jdoe@example.com
        363

------=_NextPart_000_0009_01C864B3.E29C0B20
Content-Type: text/plain
        format=flowed;
        charset="iso-8859-1";
Content-Transfer-Encoding: 7bit
364 { Content-Disposition: signature;
        key="jdoe@example.com"
                365
Thank you, Jane Doe
Administrative Assistant
369 { Jenkins & Associates, P.C.
jdoe@example.com
Phone: 281-555-5342
Fax: 281-555-9049

------=_NextPart_000_0009_01C864B3.E29C0B20--
```

COMPOSING, FORWARDING, AND RENDERING EMAIL SYSTEM

BACKGROUND OF THE INVENTION

1. Field of the Invention:

The present invention relates generally to a computer implemented method for handling email content. More specifically, the present invention relates to emails that link header content to one or more indexed signatures.

2. Description of the Related Art:

Modern users of networked computers collaborate with each other through the use of electronic messaging systems, for example, email. Email is an electronic message formed and transported via Internet and/or intranet email systems based on, for example, the Simple Mail Transfer Protocol (SMTP) and X.400 systems, among others.

Email is typically originated by a user who authors a source email using a source client. The source email is the email as transmitted from the source client. A source client is an email authoring tool, for example, IBM Lotus Notes, Google Gmail, and Microsoft Outlook, among others. Simple emails can be composed using editors such as the popular UNIX editor, vi, and directing a file so-composed to a command-line mail invocation. The command-line invocation can rely upon, for example, qmail or sendmail. Under such a circumstance, the qmail or sendmail program is the source client. An email may exist in several forms. An email may be in draft form while a user authors it. An email may be a source email, forwarded email, or received email.

A draft source email is an email that is incomplete and in the process of being written. The draft source email is a data structure stored by a source client in response to a user-entered command to edit. The draft source email may have placeholders for components usually associated with an email, for example, a to-line field, a subject field, and a body, to name a few.

After completing an email, a user may enter a command to transmit the source email. A data processing system sends the source email to a source server. A source server is a data processing system that receives email from a network and forwards the email as a forwarded email to one or more recipients as defined in the to-line field. The source server may be a store-and-forward email server. The source server may be a mail transfer agent. Typically, the source server forwards a source email as a delivered email to one or more recipients of a domain. The domain is typically assigned to a destination server so that the source server forwards emails of the domain to the destination server. Nevertheless, the source server may also be the destination server, for example, in cases where the email traverses a proprietary intranet. A delivered email is an email that is sent to a destination server, or to a server that supports the destination server. To be a delivered email, the email merely needs to be sent addressed in a manner to reach the destination server, and not necessarily received at the destination server.

The destination server, responsive to receiving the delivered email, looks up a recipient appearing in the to-line field. If the recipient is valid, the destination server may store the email in a repository associated with the recipient. At some time, usually on a set schedule, the destination client may poll the destination server. Consequently, the destination server may download the delivered email to the destination client. In this context, the destination server is the server that receives an email from a source server. However, when a destination client replies to an email, the roles of each server may be reversed such that, for purposes of the reply email, the destination server becomes the source server, and the source server becomes the destination server. A destination client is an email client that can download emails from a server and render such emails to a user. A received email is an email downloaded to a destination client.

Rendering an email comprises a data processing system displaying email content comprising the first few lines of the body of the email. The rendering may include showing text in specified fonts, showing embedded images, and providing MIME transformations of the email, for example. When visible on a computer display, a received email may be a rendered email, having a rendered body. An email displayed to a screen may still be a rendered email even though parts of the email are not displayed in an optimal form. For example, some destination clients are unable to render all fonts, and some destination clients do not in all cases display image content. Moreover, some destination clients compress portions of an email dialog by replacing a prior generation of forwarded email(s) as a graphic image, rather than displaying the text of the body of such forwarded email. Such a graphic image may be accompanied by indicia or text that indicate subject, author and date of the 'replaced' email. Indicia can be a line of text describing such information. Thus, a rendered email is any received email that is presented having at least a few characters of the body visible or a rendered image of the body visible to the display.

SUMMARY OF THE INVENTION

The present invention provides a computer implemented method for communicating a signature in a received email. Initially, a server receives a source email from a source client, the source email comprising a signature index entry and a body. The server determines for a first recipient that a first associated destination client is capable of rendering a signature of the signature index entry in response to a selection of an indexed signature. The server, responsive to a determination that the destination client is capable of rendering the signature index entry, forwards the source email to the first recipient as a delivered email using the body of the source email such that an indexed signature is present in the body of the delivered email.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is an email having signature content in a header in accordance with an illustrative embodiment of the invention;

FIG. 3B is an email arranged in multipart format in accordance with an illustrative embodiment of the invention;

FIG. 4 is a data structure for associating signatures to signature keys in accordance with an illustrative embodiment of the invention;

DETAILED DESCRIPTION OF THE PREFERRED EMBODIMENT

Figure 1:
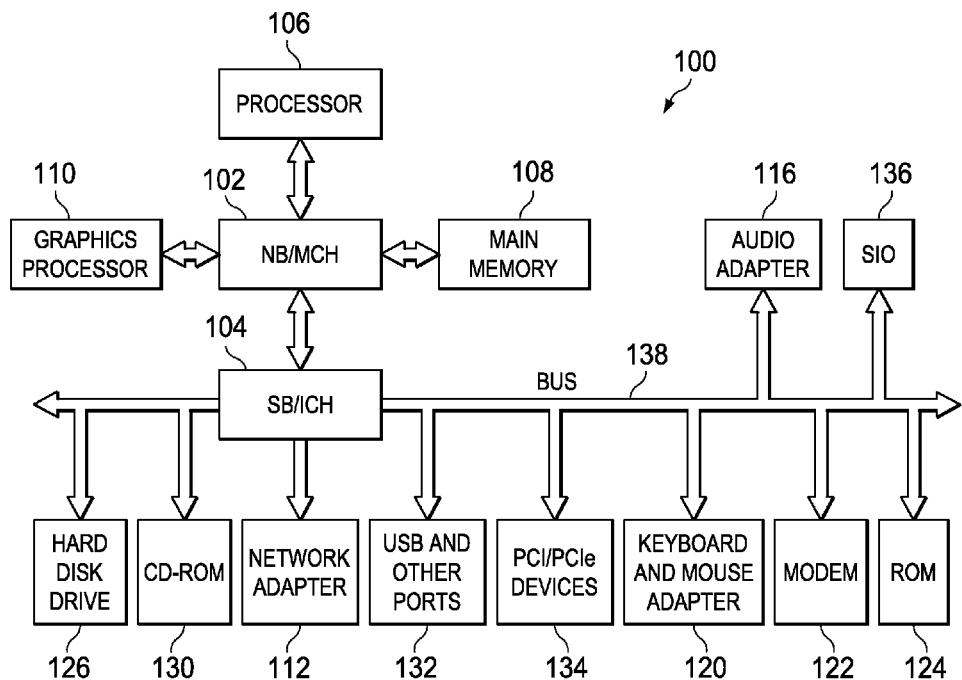
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner. The instructions stored in the computer-readable medium produce an article of manufacture, including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process. The instructions, which execute on the computer or other programmable apparatus, provide processes for implementing the functions/acts specified in the flowchart and/or block diagram block or blocks.

The aspects of the illustrative embodiments provide a computer implemented method for embedding signature data in email headers for sending. In turn, an illustrative embodiment may permit rendering an email having embedded signature headers such that one or more instances of an indexed signature may have corresponding content data in one pair of a signature and signature key found in the signature header of the received email. In addition, an illustrative embodiment may permit a server to adapt an email containing an indexed signature to an email that has a corresponding signature of the header placed in the body at the indexed signature for destination clients lacking a facility to handle indexed signatures. An indexed signature is a string of characters that include a signature locator preface and a signature key.

Figure 2:
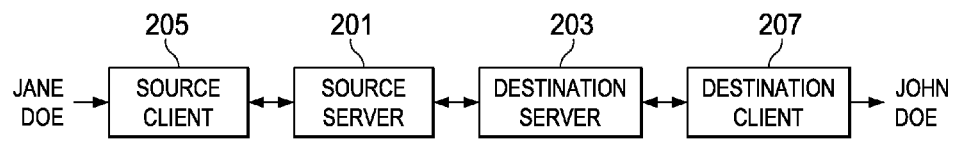
FIG. 2 is a network diagram of data processing nodes in accordance with an illustrative embodiment of the invention.

FIG. 2 is a network diagram of data processing nodes in accordance with an illustrative embodiment of the invention. Each node may be interconnected via intranet or Internet networks of between none and many computers. Source client 205 may be a data processing system operated by a user, for example, named Jane Doe. Similarly, destination client 207 may be a data processing system operated by a user, for example, John Doe. A source client 205 may compose and send a source email to source server 201. Source server 201 further processes the email to form one or more forwarded emails sent to destination server 203. Destination server 203 may store one or more delivered emails for access by destination client 207. Destination client may poll destination server 203 periodically to download emails. An email so downloaded may be a received email. Each of the nodes of FIG. 2 may be formed in accordance with the data processing system 100 of FIG. 1.

One or more embodiments of the invention encapsulates signatures in one or more signature index entries. A signature index entry contains a pair of signature data. That data comprises a signature key and a signature. A signature is self-referential material of the sender. The signature, by virtue of it being routinely attached to all emails, can comprise a significant part of email traffic over the Internet. Encapsulating the signature may permit its re-use by having indexed signatures link or point to the signature index entry used to contain the signature. A signature key is a unique key that is used to reference a signature.

A signature index entry may take several forms. The signature index entry appears once in an email for every signature key. However, an indexed signature which references the signature index entry, may appear as several instances in an email. Emails that have multiple instances of the indexed signature achieve re-use of the signature index entry linked to the indexed signature. A first form of a signature index entry is the signature header. A second form of the signature index entry is the signature carrier. A signature carrier encapsulates a signature key and a signature.

FIG. 3A is an email having a signature header in a header in accordance with an illustrative embodiment of the invention. Email 300 is comprised of headers 301, blank line 302, and body 303. A header is a sequence of lines of characters. Header fields are lines composed of a field name, followed by a separator, followed by a field body, and terminated by an end of line, for example, carriage return and/or line feed characters. A separator may be, for example, a colon (":"). A component of a header field may be distinguished from a field name in that the components are set off by an offset character, for example, a tab character. A body is a portion of the email that follows the headers. The body may be delimited from the headers by a set of new lines. It will be appreciated that there are many alternate forms of delimiting and compartmentalizing each component of an email. Consequently, an email may be formed by any manner of delimiters, and in any order. For example, XML tags may set off each component to an email.

Header 301 includes signature header 305 and secondary header material. A signature header is self-referential material of at least one sender or composer of an email placed in the header of an email. The sender can have any number of personal aspects that she feels is worthwhile posting within many, if not all, sent emails. A signature header encapsulates such self-referential material using a signature field name, a signature key, and a signature. A signature field name is a header field name adopted by convention to signal the beginning of one or more signature headers. In the example of signature header 305, the signature field name is "x-signature: ", though it is appreciated that many alternate signature field names may be adopted by convention. In the example of signature header 305, the signature key is an email address. Alternate forms of the signature key may include, for example, universally unique identifiers (UUIDs), serial numbers, and the like. An email may have multiple senders in the sense that the email may include copied details of an email previously sent, received, and copied to another email. Thus, both a sender of the copied email, as well as the sender of the response email can be considered senders. The signature can include contact information, for example, a telephone number. Contact information is any information that permits a sender to be reached or otherwise signaled. The signature can include personal details, for example, favorite quotes, and links to web-pages. In the example of signature header 305, the signature is a vCard, which itself encapsulates the sender's name, and the organization to which the user belongs. Further information may be provided as additions to, or alternatives to, the vCard pictured here. Separator 339 may separate each signature key from a signature. In addition, a separator may delimit each pair of signature key and signature from other pairs of signature keys and signatures in the signature header.

Secondary header material includes all headers that are not the signature header. Secondary header material includes the subject line field, the to-line field, among others. A to-line field is a field that includes a to-line field name and one or more recipient email addresses. An email address is an address that corresponds to a user account. The email address may include a local part as well as a domain part, as defined by Internet Engineering Task Force's RFC 2821, which is herein incorporated by reference. A recipient, in the context of an email, is at least one user assigned to an email address that appears on a recipient field. A recipient field is a field that includes email addresses that are targeted to receive the email, in whatever form. Recipient fields include, for example, the to-line field, the cc line field, the bcc line field, and any other field that identifies one or more targets to receive a message.

Following header 301, is blank line 302. The blank line is followed by body 303. A body is all text, however encoded, that follows the blank line. Body 303 includes indexed signature 333. An indexed signature is a string of characters that include a signature locator preface and a signature key. Indexed signature 333 uses, for example, a signature locator preface of "sig://" and a signature key of "jdoe@example.com". An indexed signature corresponds uniquely to a signature index entry. Nevertheless, although the signature key may appear once in the headers, several signatures may appear in among the headers. Moreover, nothing in the invention limits embodiments to have only a single signature header in an email.

FIG. 3B is an email arranged in multipart format to include a signature carrier in accordance with an illustrative embodiment of the invention. Multipart email 350 may be arranged according to multipart internet mail extensions (MIME) as defined in Internet Engineering Task Force (IETF) RFC 2822. A first part of multipart email 350 is text body part 355. A text body part is part of a body of an email that is identified as displayable or renderable. The text body part does not include a multipart header that identifies the part as a signature carrier. A second part of multipart email 350 is signature carrier 360. A signature carrier is a mail part that encapsulates signature key 365 and signature 369. Signature carrier 360 may include multipart headers 366, including multipart header 364 that identifies the part as a signature. A signature carrier is an email part that couples a signature key to a signature and is a form of a signature index entry. Like the signature header of FIG. 3A, the signature index entry is referenced by an indexed signature. Indexed signature 363 provides a signature key that can be matched to signature key 365 of signature carrier 360.

FIG. 4 is a data structure for associating signatures to signature keys in accordance with an illustrative embodiment of the invention. Associative array 400 can include one or more pairings of signature key 401 with associated signature 403. Associative array 400 can be formed by a destination client in conjunction with parsing a signature header, for example, signature header 305 of FIG. 3A. Although, in the course of replying to an email, through several responses, an email may contain multiple indexed signature instances of the same indexed signature, a source client may only include one corresponding instance of the signature to which the indexed signature corresponds. An instance is an identical copy of the logical data without reference to the arrangement of the underlying physical storage.

Figure 5:
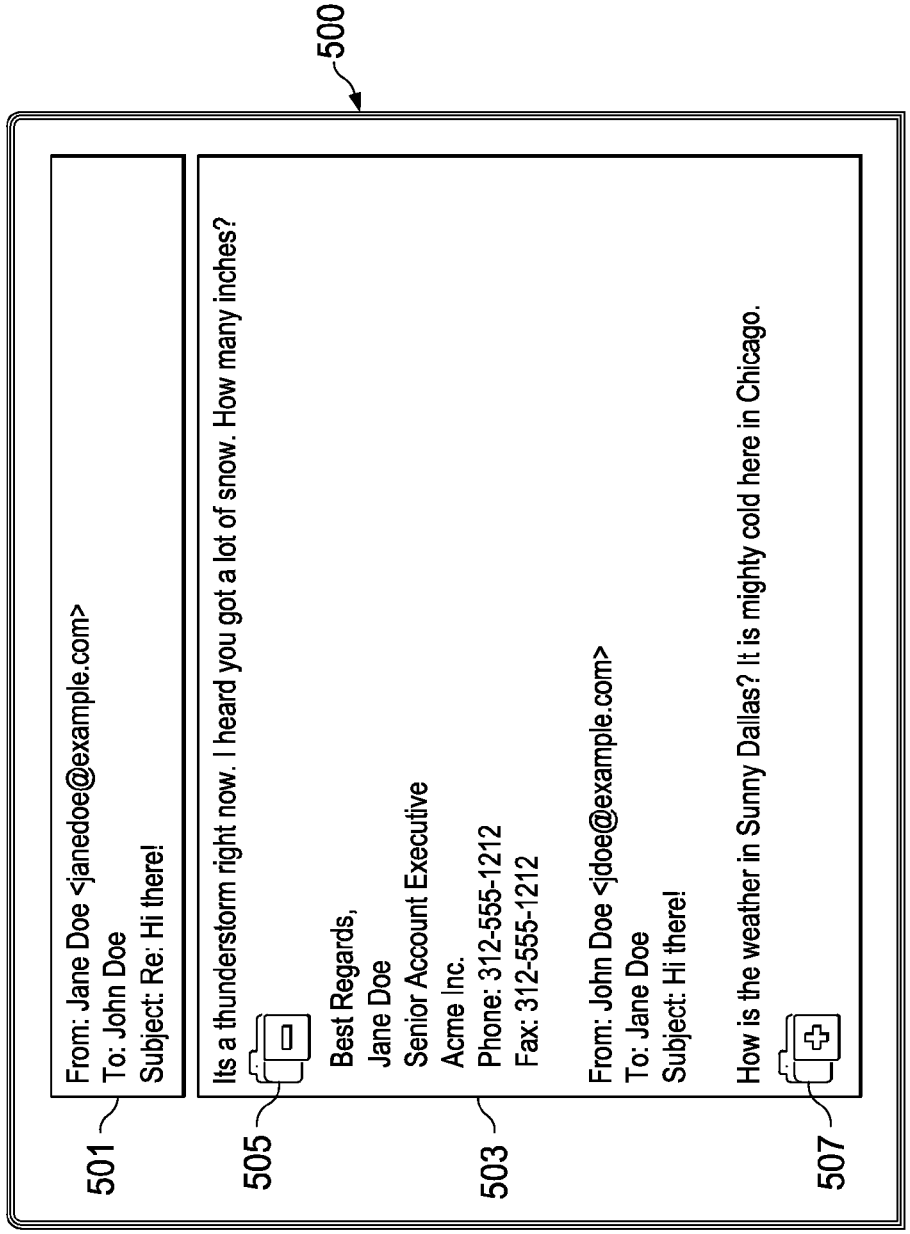
FIG. 5 is an example of a received email rendered in accordance with an illustrative embodiment of the invention.

FIG. 5 is an example of a received email rendered in accordance with an illustrative embodiment of the invention. The received email example is a rendered email 500 that contains elements of the email of FIG. 3A. The received email is rendered in two portions: key header detail 501 and rendered body 503. The rendered body may include an icon rendition of the indexed signatures. The icon rendition can be, for example, a "twistie". A twistie is an indicator that may appear in two forms, depending on the expansion of the associated data. The indicator has a folded form when the corresponding data is summarized. The indicator has an unfolded form when the corresponding data is detailed to at least one degree into any applicable hierarchy of the data. The folded form may appear as an icon bearing a plus ("+") symbol, for example, folded icon 507, whereas the unfolded form may appear as an icon bearing a negative ("−") symbol, for example, unfolded icon 505. In this example, the signature of John Doe is linked by folded icon 507. Folded icon 507 is located at an offset of nine lines from the beginning of the body of the received email, or 16 lines from the beginning of the body if the intervening signature of Jane Doe is counted. An offset is a measurement of units from a logical data location. In this case, the units are measured in lines, though the offset may be measured in other units, such as characters or pixels. In addition, the signature of Jane Doe is coupled to unfolded icon 505. Each pair of signature key and signature may be stored to an associative array corresponding to the received email. A destination client may permit rendering of a signature in response to a user selection of an indexed signature. A user selection is any input to a data processing system intended to correspond with a rendered object. A user may select an indexed signature by, for example, moving a cursor or mouse over an associated icon. The destination client may replace the icon with the detail of the signature and optionally, an unfolded icon. The detail of the signature may be controlled by the encoding of the signature. For example, ordinary text may be placed at the line and below the line of the correspondingly selected indexed signature rendition. The text below such an indexed signature rendition may be accordingly displaced downward to accommodate the signature details on screen.

Figure 6:
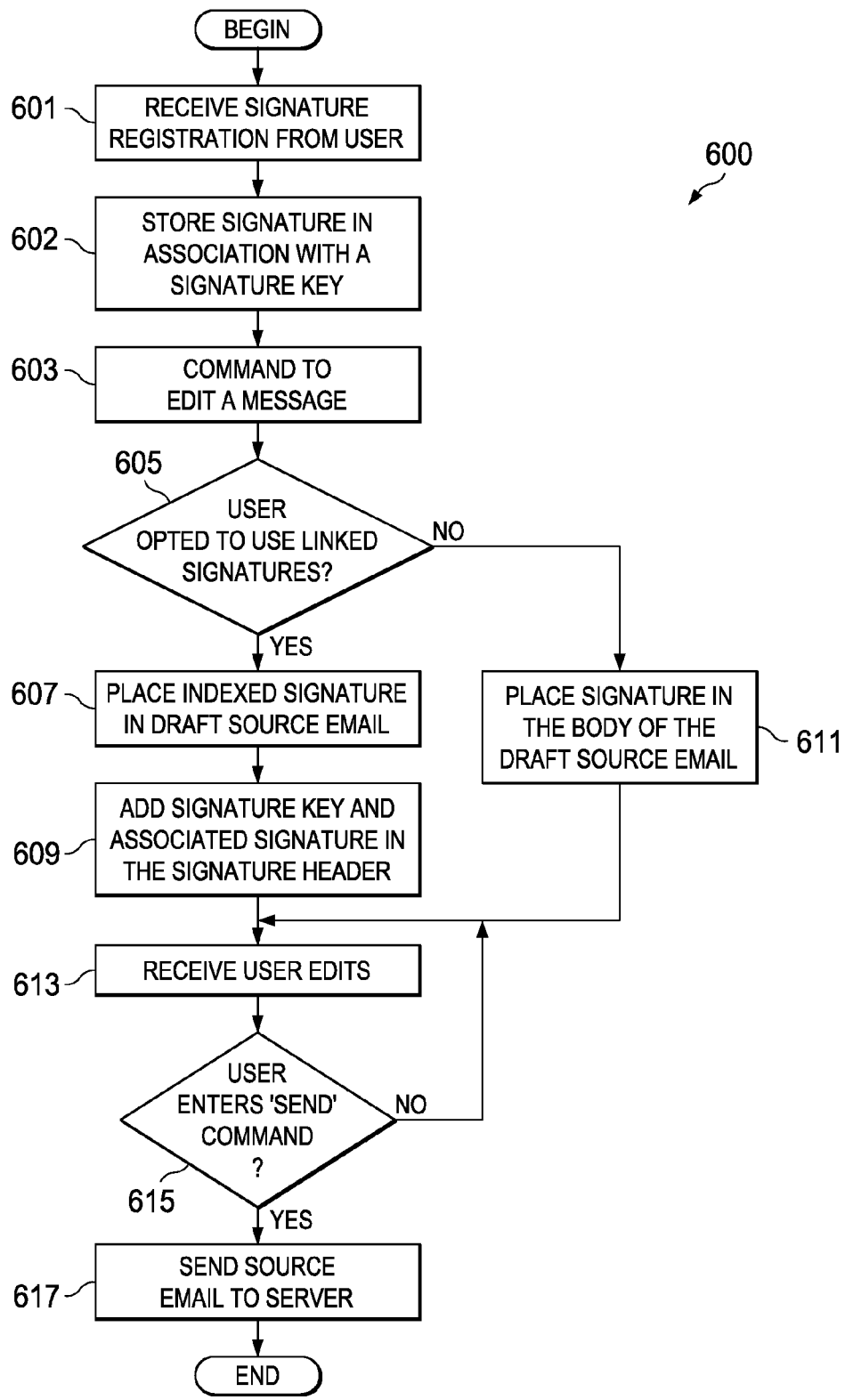
FIG. 6 is a flowchart of steps to compose and send an email in accordance with an illustrative embodiment of the invention.

FIG. 6 is a flowchart of steps to compose and send an email in accordance with an illustrative embodiment of the invention. Initially, a source client may receive a signature registration from a user (step 601). A signature registration is an indication from a user that text, graphics and other encoded data are to be automatically attached to an email body. Such text, graphics and other encoded data may be a signature. Next, the source client may store the signature in association with a signature key (step 602). Next, the source client may receive a command to edit a message (step 603). A command to edit a message may be a keystroke or a mouse click that signals an intention of the user to, for example, create a new email, reply to an email, or forward an email. Next, a source client may determine that a user opted to use linked signatures (step 605).

Responsive to a negative outcome to step 605, a source client may place a signature in the body of the draft source email (step 611). However, a source client may respond to a positive outcome by placing an indexed signature in the draft source email (step 607). Next, the source client may add a signature key and associated signature in the signature header (step 609). If a signature header does not exist, the source client will form one by writing a signature field name with the signature key and signature.

A user may then make edits to the body of the email. Thus, the source client may receive user edits (step 613). The source client may determine whether the user enters a 'send command' (step 615). A send command is a command by the user used to prompt the source client to send the draft source email as a source email over a network connection. The source client may perform error checking and communicate the results of such checks to the user at this time. Consequently, the source client may send the source email to a server (step 617). Processing terminates thereafter.

Figure 7:
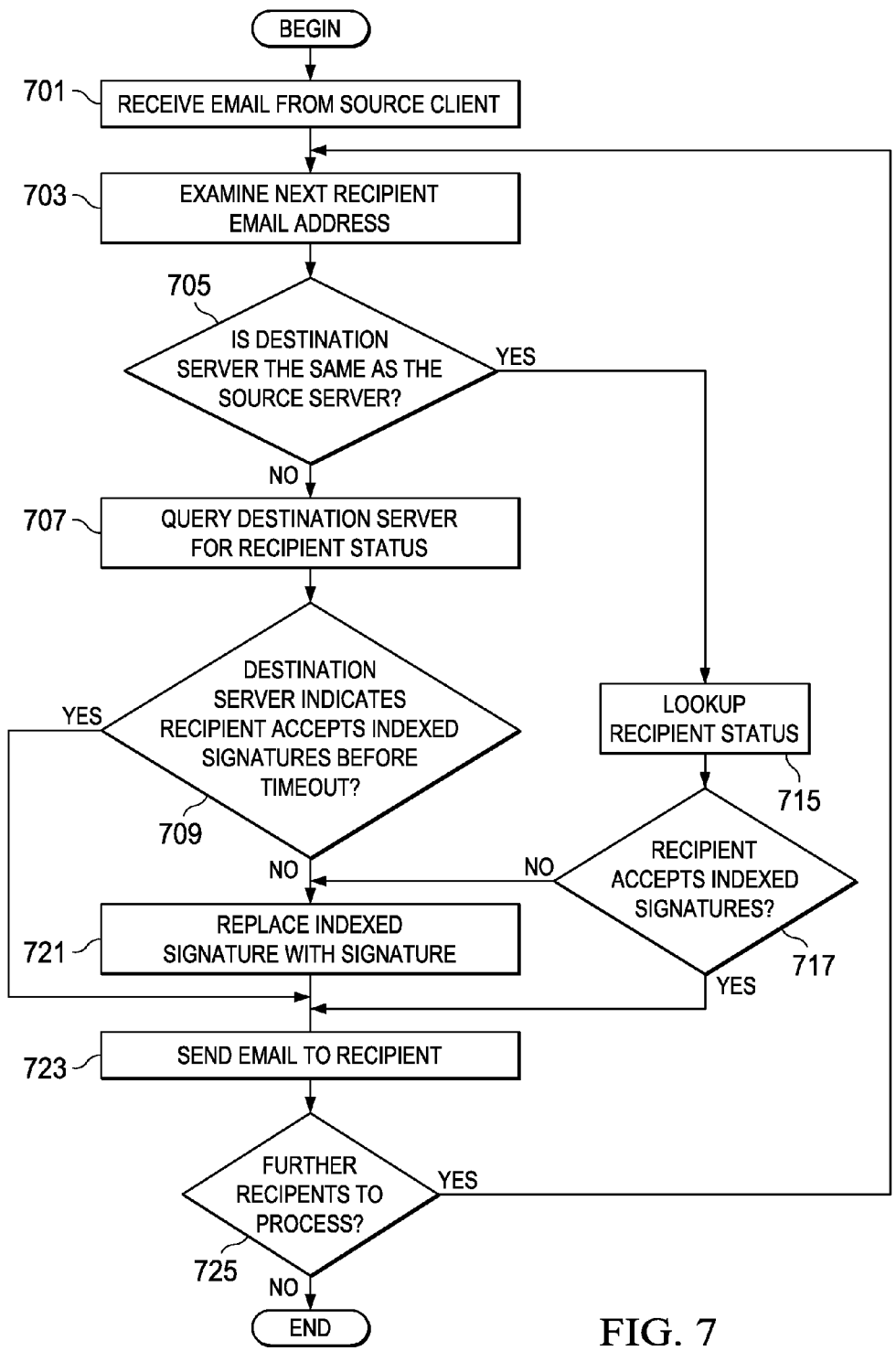
FIG. 7 is a flowchart of steps to forward an email in accordance with an illustrative embodiment of the invention.

FIG. 7 is a flowchart of steps to deliver an email in accordance with an illustrative embodiment of the invention. A source server may perform the steps of FIG. 7. The source server may be, for example, source server 201 of FIG. 2. Initially, a source server may receive a source email from a source client (step 701). Next, the source server may examine a next recipient email address (step 703). The source server may examine a next recipient email by traversing a list of email addresses that appear in a to-line field of the source email. Each recipient email address may correspond to a recipient. A recipient is a user that has an email account with a server. Each email address for each recipient may include a domain. The domain may have an associated destination server. Next, the source server may determine if a destination server is the same as the source server (step 705). In short, a recipient may have a destination server that supports the recipient's email account.

If the destination server is the same as the source server, the source server looks up the recipient status (step 715). Specifically, the source server determines if the recipient is signature compression capable. To be signature compression capable a recipient is registered as preferring that signatures be made available in a signature header. Such a preference may be stored to a table accessible to the destination server. Thus, a recipient status is an indication that for a recipient, the recipient either prefers or does not prefer to receive emails containing indexed signatures. The source server determines, for example, via the table, whether the recipient accepts indexed signatures (step 717). In addition, to be signature compression capable, at least one client used by the user may be capable of rendering the signature header independently of a secondary header material. To render a signature header independently of a secondary header material, the destination client may render the signature to a panel separate from a panel used to render secondary header material. Such a rendering is shown in rendered email 500 of FIG. 5, above.

In the case that the outcome to step 717 is positive, the source server sends the source email as a delivered email to the recipient (step 723). Such a delivered email may be unchanged in the body as compared to the source email. However, if the outcome to step 717 is negative, the source server performs a step prior to step 723. The source server may replace the indexed signature with the signature (step 721). Such a signature may be derived from the signature header.

An alternative flowchart path is taken if the determination at step 705 is negative. A negative result causes the source server to query a destination server for a recipient status (step 707). The destination server may be, for example, destination server 203 of FIG. 2. Next, the source server determines if the destination server indicates that a recipient accepts indexed signatures before a time-out (step 709). A destination server may indicate that a recipient accepts indexed signatures if the recipient is signature compression capable. If so, the destination server may indicate that the recipient is signature compression capable with a signature compression capable signal. A signature compression capable signal is a packet or other signal that references a recipient and responds affirmatively to a query concerning signature compression capability of the recipient. A negative result to step 709, causes the source server to perform steps 721 and 723, as described above. A positive result to step 709 causes the source server to perform step 723 without step 721, with respect to the current recipient.

Next, the source server may determine if there are further recipients to process (step 725). Consequently, in cases that a to-line field of a source email contains two or more recipients for processing, the source server may return to step 703, and perform the subsequent steps based on the next recipient within the to-line field. Otherwise, a negative result to step 725 causes processing to terminate.

Figure 8:
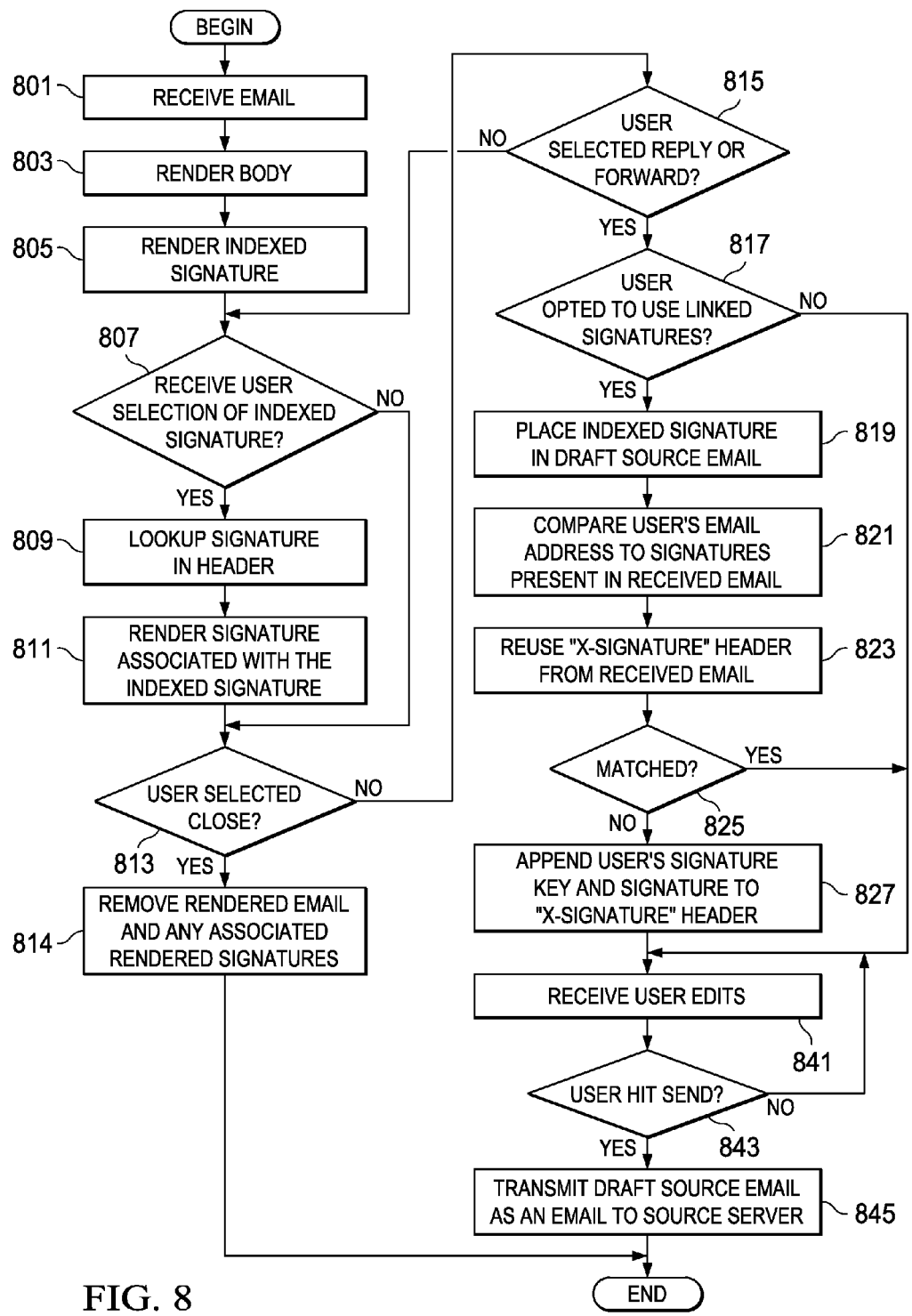
FIG. 8 is a flowchart of steps to render and otherwise handle an email received at a destination client in accordance with an illustrative embodiment of the invention.

FIG. 8 is a flowchart of steps to render and otherwise handle an email received at a destination client in accordance with an illustrative embodiment of the invention. Initially, the destination client receives a delivered email (step 801). The destination client handles delivered email to satisfy a user preference to handle indexed signatures or signature compression. Next, the destination client renders the body of the forwarded email (step 803). As noted above, rendering the body may include putting placeholders in place of email body features, such as, for example, graphic images. As a result, step 803 produces a rendered body. A rendered body is a portion of the body that fits within a body viewing panel of a display, and may include placeholders and other substitutions for the literal content of the body. The portion of the body does not include a signature carrier. Next, the destination client may render an indexed signature (step 805). An indexed signature may be, for example, indexed signature 333 of FIG.

3. Rendering the indexed signature may include decorating text of the indexed signature such that the text is decorated with link indicia. Link indicia can be, for example, an underline and a blue coloring.

Attendant with rendering the email body, the destination client may render the email to form a rendered email.

Next, the destination client may receive a user selection of an indexed signature (step 807). If so, the destination client looks up a signature associated with the indexed signature (step 809). The lookup is based, for example, on the signature header and which among the indexed signatures the user selected. Such a lookup can rely on a data structure that stores pairs of signature keys and signatures. For example, the destination client may have initially stored the pairs of signature keys and signatures as an associative array contemporaneously with rendering the body of the email. Next, the destination client renders the signature associated with the indexed signature (step 811).

The destination client may render the signature in several ways. One way to render the signature is to place the signature content onto a display beginning at a location shown by an indexed signature to which the signature corresponds. For example, a user that clicks on folded icon 507 of FIG. 5 may be presented with additional detail below the indexed signature, concurrently with a general shift of the pre-existing rendered content being pushed downward on the display. Alternatively, the destination client may provide a pop-up dialog that provides details of the signature.

After step 811 or following a negative determination to step 807, the destination client may determine if the user issued a command to close the rendered email (step 813). A positive determination causes the destination client to remove the rendered email and any associated rendered signatures (step 814). A negative determination to step 813 causes the destination client to determine if the user selected a reply or forward option (step 815). The user may select a reply option by entering a command to reply to the destination client. A command to reply is a command to send a response message to a recipient described by the to-line header of the received email. A negative result to step 815 causes the destination client to repeat step 807 and one or more subsequent steps.

However, if the outcome to step 815 is positive, the destination client determines if the user opted to use inline signatures (step 817). A user may opt to use indexed signatures by entering a value to a preference that indicates a persistent desire to use indexed signatures. Alternatively, the user may opt to use indexed signatures by providing a command to add an indexed signature to a draft source email. A command to add an indexed signature is a command made by the user to place the indexed signature in at least one draft source email. A positive result to step 817 causes the destination client to place an indexed signature into a draft source email (step 819). The indexed signature includes a signature key that corresponds to the user's selected email account. The selected email account is the account, corresponding to a user's email, from which the user wishes the email to appear to originate. In other words, the user selects the user's selected email account by indicating to the destination client which among possibly several email addresses that the user wants to appear on the from-line header. The draft source email, in this case, may include the body content, as well as selected headers of the received email.

Next, the destination client compares the user's email address to signatures present in the received email (step 821). The destination client also reuses the signature header of the received email (step 823). Next, the destination client determines if there is a match between the user's signature key (of an applied default user signature) and any signature key present in the signature header of the received email (step 825).

If a match is determined not to exist, per step 825, the destination client appends the user's signature key and signature to the signature header of the draft source email (step 827). Step 827 may include adding a new signature header, as noted above. If a match is made in step 825, the destination client may perform step 841.

If a user did not opt to use indexed signatures, per step 817, or did not find a match, per step 825, execution may continue at step 841. A destination client may receive user edits to the draft source email (step 841). The destination client may add text, graphics and other data accordingly. Next, the destination server may determine if the user gave a send command (step 843). Absent a send command, the destination server may continue to receive user edits at step 841. Otherwise, responsive to a user's send command, the destination client may transmit the draft source email to a source server (step 845).

The illustrative embodiments permit a user to embed signature data in email headers and other encapsulated signature forms. In turn, an illustrative embodiment may permit rendering an email having such signatures so that an indexed signature may be coupled to content data encapsulated outside the body the received email. In addition, an illustrative embodiment may permit a server to adapt an email containing an indexed signature to an email that has a corresponding signature of the header placed in the body of the indexed signature for destination clients lacking a facility to handle indexed signatures.

Although the embodiments of the invention have shown a signature index entry in a signature header form and a signature carrier form, it is appreciated that the scope of the invention may extend to other forms of signature index entries.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for converting a signature in a header, the method comprising:
   receiving a received email comprising a signature index entry in a header of the email and an indexed signature, the signature index entry having a signature;
   receiving a user selection of the indexed signature, wherein the indexed signature comprises an email address having a signature locator preface; and
   responsive to receiving a user selection of the indexed signature, rendering the signature.

2. The computer implemented method of claim 1, wherein rendering the signature comprises displaying the signature at an offset into a rendered body of the received email based on an offset associated with the indexed signature.

3. The computer implemented method of claim 1, further comprising:
   rendering the indexed signature as a twistie within a rendered body of a rendered email.

4. The computer implemented method of claim 1, wherein rendering further comprises:
   removing the indexed signature, wherein the indexed signature comprises a signature key and the step of rendering comprises reading the signature key.

5. The computer implemented method of claim 1, wherein prior to receiving a user selection of the indexed signature, rendering the indexed signature as text decorated with link indicia.

6. The computer implemented method of claim 1, wherein the indexed signature comprises a signature key and the step of receiving a user selection further comprises:
   looking up the signature based on the signature key.

7. The computer implemented method of claim 1, wherein receiving a user selection of the indexed signature comprises receiving a cursor movement over a signature key.

8. A computer implemented method for generating a signature header in a draft source email, the method comprising:
   receiving a command to add an indexed signature to a draft source email;
   adding an indexed signature to the draft source email, wherein the indexed signature comprises an email address having signature locator preface;
   adding a signature header in a header of the email to the draft source email, wherein the indexed signature includes a first instance of the signature key and the signature header includes a second instance of the signature key and the first instance of the signature key matches the second instance of the signature key; and
   transmitting the draft source email as a source email, wherein the second instance of the signature key is unmatched among signature keys within the signature header.

9. The computer implemented method of claim 8, wherein receiving a command to add further comprises:
   receiving a command to edit the draft source email; and
   determining that a user opted to use linked signatures, wherein the step of adding the indexed signature is responsive to the determination that the user opted to use linked signatures.

10. The computer implemented method of claim 8, further comprising:
   receiving a command to reply to a received email, the command originating from a user;
   copying at least one signature header of the received email into a signature header of a draft source email based on the received email;
   determining that the at least one signature header includes a signature key matching an email address of the user's selected email account; and
   inserting the indexed signature.

11. The computer implemented method of claim 8, further comprising:
   receiving a received email, the received email having a received signature header, the received signature header comprising at least one signature key and at least one signature, wherein receiving a command to add the signature header comprises adding the signature header based on the at least one signature key and the at least one signature.

12. The computer implemented method of claim 8, further comprising:
   receiving a signature registration that associates the signature key with the signature from a user.

13. A computer implemented method for communicating a signature, the method comprising:
   receiving a source email from a source client, the source email comprising a signature index entry and a text body part;

determining for a first recipient that a first associated destination client is capable of rendering a signature of the signature index entry in response to a selection of an indexed signature; and responsive to a determination that the destination client is capable of rendering the signature index entry, forwarding the source email to the first recipient as a delivered email using the text body part of the source email such that an indexed signature is present in the text body part of the delivered email and the indexed signature is an email address having signature locator preface.

14. The computer implemented method of claim 13, wherein the signature index entry comprises a signature header, the signature header comprising:
- a signature field name;
- a signature key corresponding to a sender; and
- a signature, wherein the source email comprises a body having a first indexed signature comprising a signature key and a second indexed signature comprising the signature key.

15. The computer implemented method of claim 14, further comprising:

determining for a second recipient that an associated second destination client is not capable of rendering the signature of the signature index entry header independently of a secondary header material of the email;

responsive to a determination that the associated second destination client is not capable of rendering the signature, replacing the indexed signature with the signature header in a delivered email; and forwarding the delivered email.

16. The computer implemented method of claim 15, wherein the step of determining for the second recipient that the associated second destination client is not capable of rendering the signature header further comprises:

querying a destination server associated with the second destination client; and failing to receive a signature compression capable signal before a timeout expiration.

17. The computer implemented method of claim 13, wherein the signature index entry is a signature carrier.

* * * * *